Oct. 8, 1968  S. WASSERMAN  3,404,671
BARBECUE AND DISPOSABLE MEMBERS FOR THE GRATES THEREOF
Filed July 7, 1966

INVENTOR.
SEYMOUR WASSERMAN
BY
Leonard H. King
ATTORNEY

United States Patent Office 3,404,671
Patented Oct. 8, 1968

3,404,671
BARBECUE AND DISPOSABLE MEMBERS FOR THE GRATES THEREOF
Seymour Wasserman, 617 Prescott Place,
North Woodmere, N.Y. 11598
Filed July 7, 1966, Ser. No. 563,479
8 Claims. (Cl. 126—25)

ABSTRACT OF THE DISCLOSURE

A barbecue grill having disposable slipon grate covers.

This invention relates generally to barbecues and in particular to a barbecue having disposable members covering the grate thereof.

Barbecues are very popular today, especially for outdoor cooking. Broadly, the barbecue comprises a receptacle for the fuel and a grate disposed above the fuel receptacle. The food is placed on top of the grate for cooking. While the present invention will be described in connection with a portable barbecue of a type that an individual would use outdoors, it will be apparent that the novel structure is equally applicable to indoor barbecues, used either for commercial or non-commercial purposes.

In order to facilitate cleaning of the barbecue, removable grill rods are disclosed in U.S. Patent No. 3,101,080, issued to A. G. Lorbacher on Aug. 20, 1963. However, the rods must still be cleaned and, while it is somewhat easier to do with the rods removed, it is still an unpleasant chore. Even with all of the cleaning tools now on the market, it is very difficult and tedious to properly clean a barbecue grill. Hence the Lorbacher patent, while a step forward, does not completely solve the problem.

U.S. Patent No. 3,082,757 granted to D. G. Hohe on Mar. 26, 1963, represents another approach to the cleaning problem inherent with use of a barbecue. In this patent a disposable grill cover is removably positioned on the permanent grill. A feature of Patent No. 3,082,757 is that the thin aluminum foil disposable cover has substantially the same shape as the permanent grill. Tabs in the cover fit into the openings in the permanent grill. It will be appreciated, however, that the disposable cover is applicable to only one size and shape grill and even more important may readily be distorted in handling because it is so thin. Thus it may be very difficult to apply the disposable member to the permanent member.

By way of contrast, this invention completely eliminates the need for cleaning a barbecue grill. A substantially tubular, disposable sleeve member is provided for each of the individual grill rods. Further, various means will be described for separately placing on and removing each of the sleeves without requiring major assembly procedures. Therefore, because of the combination of their low cost and ease of replacement, the sleeves may be disposed of when they become soiled as by one or more usages. At present, tubular aluminum is the preferred material for the sleeve members although it is to be understood that those skilled in the art may use different materials provided the several criteria are met.

Accordingly, it is an object of this invention to provide individual, disposable sleeve means for the rods of a barbecue grill.

It is another object to provide an improved barbecue grill having means to removably assemble protective sleeve members on each rod thereof.

An additional object is to provide an improved barbecue grill having individual, disposable sleeves covering each rod thereof.

A particular object is to provide improved means for installing and removing disposable sleeve members on each of the rods of a barbecue grill.

These and other features, objects and advantages of the invention will, in part, be pointed out with particularity and will, in part, become obvious from the following more detailed description of the invention, taken in conjunction with the accompanying drawing which forms an integral part thereof.

In the various figures of the drawing like reference characters designate like parts.

Figure 1:
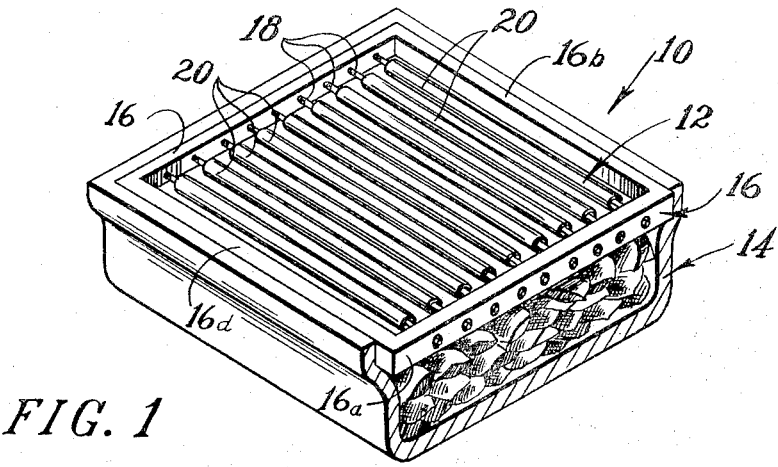
FIG. 1 is a perspective view of a barbecue grill employing the structure of this invention.
Figure 2:
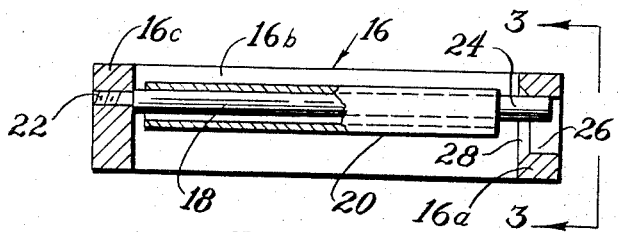
FIG. 2 is an enlarged longitudinal sectional view through a typical rod and sleeve disposed thereon.
Figure 3:
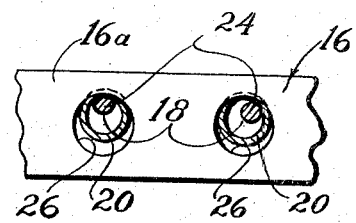
FIG. 3 is a fragmentary side elevational view of the barbecue grill taken along line 3—3 of FIG. 2.

Referring to FIGS. 1, 2 and 3, a barbecue 10 is shown as comprising a grill 12 disposed over a fuel receptacle 14. The grill portion is in turn comprised of a frame member 16 having sides 16a, 16b, 16c, and 16d, a plurality of rods 18 extending across the grill between opposed sides 16a and 16c and a disposable sleeve 20 covering each of the rods. While a square grill is illustrated, it will become evident that the concepts of this invention apply equally as well to a rectangular barbecue. The present invention may also be applied to the conventional circular grill although different length sleeves must be provided for the different length rods.

One end 22 of each rod is rigidly secured in side 16c of the frame member. This may be done in any one of several ways such as welding, staking, retaining rings, pins or, as is illustrated, by means of a mating threaded connection. The opposite end 24 of each rod is loosely captured in the opposed side 16a of the frame. In FIGS. 2 and 3, it will be seen that clearance holes 26 in frame member 16a are substantially larger than rods 18 and only slightly larger than the outside diameter of sleeve 20.

Accordingly, the sleeves may be removed through the clearance holes and disposed of when they are soiled. However, it will be appreciated that the sleeves will not fall out by themselves under normal usage since the sleeves are eccentrically disposed about the rods due to their own weight. Since one end of the rods is free, the sleeves may be easily placed on and also removed therefrom by aligning the rods with clearance holes. Alignment may be achieved by exerting a slight pressure on the rods which typically are of 1/8″ diameter. While not preferred embodiment, the rods may be concentrically positioned in the hole. To facilitate the removal of the sleeves, the inner side of the clearance holes may be generously chamfered, as shown at 28 of FIG. 2.

Figure 4A:
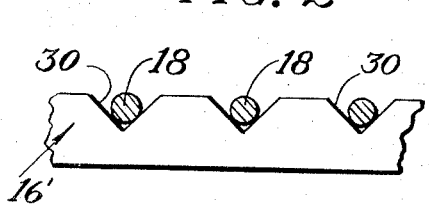
FIGS. 4A and 4B are end elevational and perspective views, respectively, illustrating alternative means for mounting the free end of the rods.

In an alternative embodiment of this invention, the free end of each rod may be positioned in an upwardly open notch in the side 16a′ of the grill frame 16′. Notches 30 are shown in FIG. 4A to be V-shaped although it is to be understood that they may be semicircular, as shown at 32 in FIG. 4B or of any other convenient configuration. The centerline of the rods should normally be just at or slightly lower than the lowest point of the notch. In this manner, there will be a slight interference and it will be necessary to flex the rods in order to get the sleeves on and off. The rods are sufficiently flexible to permit usage of this means for retaining the sleeves.

Figure 4B:
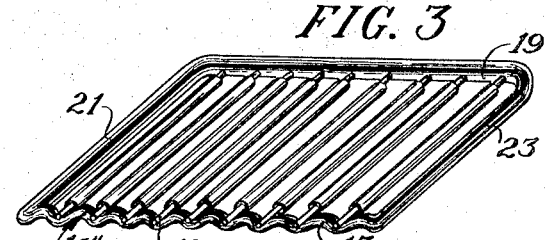

In FIG. 4B there is shown a method of fabricating a grill incorporating the invention. In this embodiment a frame 16″ is formed of wire having sides 16, 19, 21 and 23. Sides 19, 21 and 23 may be straight and side 16 formed with a series of indulations defined by alternating peaks and valleys. The free ends of rods 18 are disposed and retained in the valleys.

Figures 5, 6, 7:
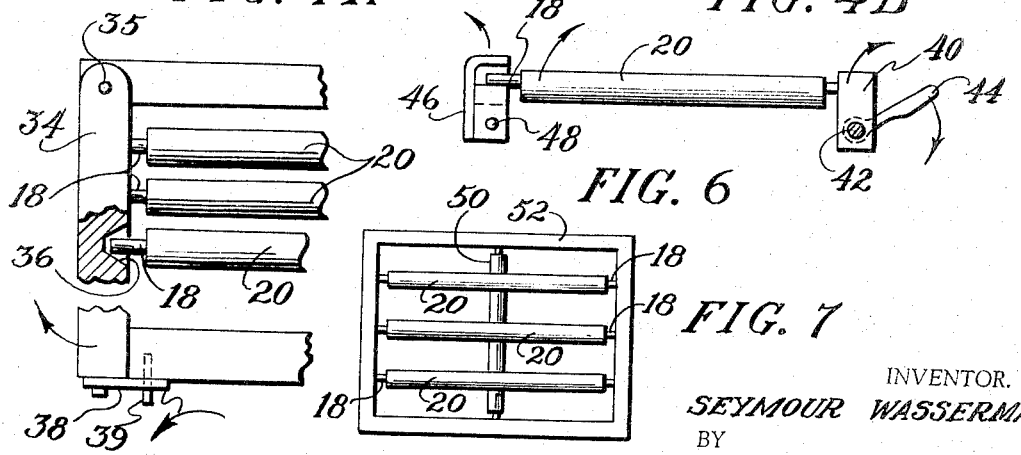
FIG. 5 is a sectional plan view showing another alternative means for securing the free end of the rods.
FIG. 6 is a sectional elevational view of still another embodiment of means for mounting the free end of the rods.
FIG. 7 is a plan view of a grid having a transverse supporting member.

FIG. 5 and 6 illustrate alternative means for securing the free end of the rods. In the FIG. 5 embodiment, which is a plan view, the side of the frame opposite the fixed end of the rods is movable. Frame side 34 is pivotal in a horizontal plane as a unit on hinge pin 35. Recesses 36, which are preferably conical, are provided on the inside, vertical surface of the frame member to receive the rod ends. Suitable latch means 38 that engage a fixed pin 39 in an adjacent side of the grill frame may also be included so that the frame may not be accidentally opened.

The embodiment shown in elevational view of FIG. 6 provides for movement of the rods, as a unit in a vertical plane. Frame side 40, which includes the fixed end of the rods, is pivoted about shaft 42. A lever 44 is used for this purpose and elongated, latching means 46 pivotal on pin 48 may also be included. In this embodiment, the side of the frame opposite but parallel to shaft 42 should include upwardly open notches such as the types shown, for example, in FIG. 4A, in order to accommodate the free end of the rods.

Where a long span is employed, it is desirable to provide a transverse support rod 50 removably disposed in frame 52. This rod may also be provided with a disposable cover 20. The longitudinal rods 18 and their covers 20 rest on rod 50 as shown in FIG. 7.

The description thus far has contemplated the use of tubular sleeves that are completely closed along their length. I have found that this type of construction is essential. Conceivably, however, the sleeves can have a longitudinal slot formed in the wall thereof, but this is not as desirable. The use of a closed tube permits the use of light gauge foils such as 0.001″ wall material without the tube being torn away from the rods when it sticks to the meat being broiled. When an open sleeve is employed a heavier material is required, one stiff enough to resist opening under the tension of sticking meat being lifted off. The cost of the added material is a significant factor. Further, the presence of the open slot results in the undesirable entrance of grease to the supporting rod defeating the purpose of the covering.

It should also be understood that the invention is not limited to sleeves having a substantially circular cross section although this is the only type shown in the drawing. Other geometric shapes such as square, rectangular, hexagonal, etc., may be used.

The sleeves may be fabricated as an extrusion of a low cost metal such as aluminum. Alternatively, the sleeves may be made by a continuous spiral wrapping. Still another manner of making the sleeves is by forming a sheet of aluminum foil into a tube and crimping the longitudinal seam. All of these techniques are well known in the art and any of them may be successfully used to fabricate low cost disposable sleeves.

If, as is usually the case, only a portion of the grate cover is soiled, only that portion of the grate cover is replaced. The economic advantage of this feature is of utmost importance to the marketability of the device.

From the foregoing it is evident that a new and useful improvement has been made to a barbecue grill. The cleaning problem inherent in the prior art devices has been eliminated by the inclusion of disposable removable sleeves covering the rods of the barbecue grill. Various means have been described and illustrated to permit the easy placement and removal of the sleeves. Because the cost of the sleeves is low they may be discarded after each usage and a clean cooking surface will always be available without the drudgery that was heretofore necessary.

There has been disclosed heretofore the best embodiment of the invention presently contemplated and it is to be understood that various changes and modifications may be made by those skilled in the art without departing from the spirit of the invention.

What is claimed is:

1. An improved barbecue grill comprising, in combination:
    (a) a frame member having opposed sides;
    (b) a plurality of elongated rods having first and second ends positioned in opposed sides of said frame member, the first ends of said rods being rigidly secured in said frame member, the second end of said rods being loosely retained in said frame member; and
    (c) a disposable metal sleeve loosely and removably mounted on each of said rods whereby said sleeves may be removed and replaced by a sliding motion over the second end of said rods.

2. The combination in accordance with claim 1 wherein said frame side supporting the second end of said rods is provided with a plurality of holes having a diameter substantially greater than said rods and only slightly greater than said sleeves, the second end of said rods being loosely disposed in said holes.

3. The combination in accordance with claim 2 wherein the second end of said rods and the end of said sleeves thereabout are eccentrically positioned with respect to the holes in said frame side.

4. The combination in accordance with claim 1 wherein said frame side supporting the second end of said rods includes a plurality of upwardly facing notches, the second end of said rods being loosely disposed in said notches.

5. The combination in accordance with claim 1 wherein said frame side supporting the first end of said rods is pivotally secured to the remainder of said frame, said pivotal side being movable about a horizontal axis perpendicular to the axis of said rods.

6. The combinatio inn accordance with claim 1 wherein at least the side of said frame retaining the second end of said rods has an undulating form defined by alternating peaks and valleys, the second end of said rods being disposed in the valleys.

7. The combination in accordance with claim 6 wherein the side of said frame retaining the second end of said rods is a wire.

8. The combination in accordance with claim 6 wherein in all sides of said frame are wire.

References Cited

UNITED STATES PATENTS 3,082,757    3/1963    Hohe.

FREDERICK KETTERER, *Primary Examiner.*